United States Patent
Zeira et al.

(10) Patent No.: US 11,517,141 B1
(45) Date of Patent: Dec. 6, 2022

(54) INK-PRINTING APPARATUSES, METHODS AND FORMULATIONS

(71) Applicant: Ripples Ltd., Petah Tikva (IL)

(72) Inventors: Assaf Zeira, Tel Aviv (IL); Eitan Mass, Ramat Gan (IL)

(73) Assignee: RIPPLES LTD., Petach Tikva (IL)

( * ) Notice: Subject to any disclaimer, the term of this patent is extended or adjusted under 35 U.S.C. 154(b) by 478 days.

(21) Appl. No.: 16/584,991

(22) Filed: Sep. 27, 2019

Related U.S. Application Data

(60) Provisional application No. 62/737,896, filed on Sep. 27, 2018.

(51) Int. Cl.
*B41J 3/407* (2006.01)
*B41J 2/045* (2006.01)
(Continued)

(52) U.S. Cl.
CPC .............. *A47J 31/4496* (2013.01); *A23L 2/58* (2013.01); *A23P 20/15* (2016.08); *B41J 2/0458* (2013.01);
(Continued)

(58) Field of Classification Search
CPC ........ B41J 2/01; B41J 2/04536; B41J 2/0458; B41J 3/407; B41M 5/0023; A23L 2/58; A23L 5/42; A47J 31/00; A47J 31/02; A47J 31/44; A47J 31/4496; A23P 20/15; C09D 11/033; C09D 11/037; C09D 11/14; C09D 11/16; C09D 11/322; C09D 11/38;
(Continued)

(56) References Cited

U.S. PATENT DOCUMENTS 2,801,920 A   8/1957   Reich
5,714,183 A   2/1998   Nicolas et al.
(Continued)

FOREIGN PATENT DOCUMENTS

CN   104097405 A   10/2014
CN   105831557 A   8/2016
(Continued)

OTHER PUBLICATIONS

Hassan, Christie & Peppas, Nikolaos. (2000). Structure and Applications of Poly(vinyl alcohol) Hydrogels Produced by Conventional Crosslinking or by Freezing/Thawing Methods.
(Continued)

*Primary Examiner* — Anh T Vo
(74) *Attorney, Agent, or Firm* — Momentum IP; Marc Van Dyke

(57) ABSTRACT

A method of printing with coffee-based ink comprises providing a thermal ink-jet cartridge having a quantity of a coffee-based ink disposed within; receiving optical density data from a user via a touch-screen computerized interface, where the data describes an optical density of the coffee-based ink present within an ink-jet pod; and computing a customized droplet-size for the coffee-based ink in its current state within the thermal ink-jet cartridge. A suitable printing apparatus can include coffee-based ink in a cartridge, an image-processing system, an image processing module for determining, inter alia, droplet size and missing/defective nozzles, and a nozzle-compensation module. Suitable ink formulations are human-edible and aqueous.

20 Claims, 7 Drawing Sheets

(51) Int. Cl.
  *A47J 31/44* (2006.01)
  *A23L 2/58* (2006.01)
  *B41M 5/00* (2006.01)
  *C09D 11/322* (2014.01)
  *C09D 11/38* (2014.01)
  *C09D 11/037* (2014.01)
  *C09D 11/14* (2006.01)
  *A23P 20/15* (2016.01)
  *C09D 11/033* (2014.01)
  *A23P 20/25* (2016.01)

(52) U.S. Cl.
  CPC .......... *B41J 2/04536* (2013.01); *B41J 3/407* (2013.01); *B41M 5/0023* (2013.01); *C09D 11/033* (2013.01); *C09D 11/037* (2013.01); *C09D 11/14* (2013.01); *C09D 11/322* (2013.01); *C09D 11/38* (2013.01); *A23P 2020/253* (2016.08); *A23V 2002/00* (2013.01)

(58) Field of Classification Search
  CPC .............. G07F 13/065; G06Q 30/0601; G06Q 30/0603; G06Q 30/0631; G06Q 30/0635
  See application file for complete search history.

(56) References Cited

U.S. PATENT DOCUMENTS

| | | | |
|---|---|---|---|
| 5,981,826 | A | 11/1999 | Ku |
| 6,536,345 | B1 | 3/2003 | Young |
| 8,753,702 | B2 | 6/2014 | Baker et al. |
| 9,731,514 | B2 * | 8/2017 | Eliav ................. G06Q 30/0635 |
| 10,813,488 | B2 * | 10/2020 | Lavie ...................... A23L 2/58 |
| 2005/0029287 | A1 | 2/2005 | Mobbs |
| 2008/0260912 | A1 | 10/2008 | Scott |
| 2009/0202686 | A1 | 8/2009 | Lavie et al. |
| 2009/0317519 | A1 * | 12/2009 | Lavie ...................... A23L 2/58 705/50 |
| 2015/0147444 | A1 | 5/2015 | Eliav et al. |
| 2015/0251470 | A1 | 9/2015 | Lavie et al. |
| 2017/0066252 | A1 | 3/2017 | Eliav et al. |

FOREIGN PATENT DOCUMENTS

| | | |
|---|---|---|
| JP | 2015142699 A | 8/2015 |
| WO | 2017221077 A2 | 12/2017 |

OTHER PUBLICATIONS

Nunes, F. M., & Coimbra, M. A. (2002). Chemical characterization of galactomannans and arabinogalactans from two arabica coffee infusions as affected by the degree of roast. Journal of agricultural and food chemistry, 50(6), 1429-1434.

Zeira A, Nussinovitch A. Mechanical properties of weak locust bean gum (lbg) gels under controlled rapid freeze-thawing. Journal of texture studies. 2003;34(5-6):561-73.

Basumallick, Lipika and Rohrer, Jeffrey (2003). Analyzing Coffee Carbohydrates.

Redgwell, Robert & Fischer, Monica. (2006). Coffee carbohydrates. Brazilian Journal of Plant Physiology. 18. 10.1590/S1677-04202006000100012.

Bunzel, Diana & Reichardt, Nicole & Ralph, John & Blaut, Michael & Steinhart, Hans & Bunzel, Mirko. (2008). Isolation and characterisation of a coffee melanoidin fraction. Journal of the Science of Food and Agriculture. 88. 2153.

Nunes, Fernando M. & Cruz, Ana & Coimbra, Manuel. (2011). Insights Into Coffee Melanoidin Structure and Formation Mechanism.

Moreira, A. S., Nunes, F. M., Domingues, M. R., & Coimbra, M. A. (2012). Coffee melanoidins: structures, mechanisms of formation and potential health impacts. Food & function, 3(9), 903-915.

Echavarría Vélez, Ana Paola & Pagan, Jordi & Ibarz, Albert. (2012). Melanoidins Formed by Maillard Reaction in Food and Their Biological Activity Food Engineering Reviews. 4.203-223.

CN104097405A Machine Translation (from Google Patents)—published Oct. 15, 2014; Guangzhou Duopu Network Technology Co Ltd.

JP2015142699A Machine Translation (from Google Patents)—published Aug. 6, 2015; Denso Corp, Nippon Soken Inc.

CN105831557A Machine Translation (from Google Patents)—published Aug. 10, 2016; Yunnan Agricultural University.

* cited by examiner e.g. to Increase viscosity — Contacting S101 grounded or ungrounded light-roasted coffee beans with an aqueous solution (e.g. hot water) so that colorant (e.g. coffee melanoidin nanopigments) migrates from the coffee beans migrates into the aqueous solution e.g. to Increase viscosity — Further increase S105 a concentration of the coffee melanoidin nanopigments within the aqueous solution (e.g. by evaporating – for example, a controlled evaporation process)

e.g. to Increase viscosity — Add S109 humectant (e.g. glycerol)

e.g. to decrease viscosity — At a time when a pH of the aqueous solution is relatively low (i.e. at most 4.5), subject S113 the aqueous solution to a separation process which:
(i) Reduces a concentration of galactomannans dissolved within the ink formation; and/or
(ii) Reduces a total concentration of coffee melanoidin nanopigments while increasing a ratio between: (A) a concentration of low molecular weight (LMw) melanoidin particles and (B) a concentration of high molecular weight (HMw) melanoidin particles)

Ink-jet S125 the ink onto a foamed beverage to form an image on an upper surface of the beverage

FIG. 7

INK-PRINTING APPARATUSES, METHODS AND FORMULATIONS

CROSS-REFERENCE TO RELATED APPLICATIONS

This patent application claims the benefit of U.S. Provisional Patent Application No. 62/737,896 filed on Sep. 27, 2018, which is incorporated herein by reference in its entirety.

BACKGROUND

It is known in the art to roast coffee beans. Wikipedia categorizes roasted of coffee beans as follows:

|  | Common roast names | Notes | Surface | Flavor |
| --- | --- | --- | --- | --- |
| Light | Cinnamon Roast, American Roast, New Engiand Roast, Half City Roast, Moderate-Light Roast | After several minutes the beans pop or crack and visibly expand in size. This stage is called first crack. | Dry | Lighter-bodied, higher acidity, no obvious roast flavor. This level of roast is ideal for tasting the full origin character of the coffee. |
| Medium | City roast, City+ Roast, Full City Roast | After being developed through first crack, the coffee reaches these roast levels. | Dry | Acidity has been muted. Further roasting results in coffee with higher body, but some roast flavor imposed. |
| Dark | Full City+ Roast, Italian Roast, Vienna Roast, French Roast | After a few more minutes the beans begin popping again, and oils rise to the surface. This is called second crack. | Shiny. The level of oil correlates to how far the coffee is taken past second crack. | Bittersweet flavors are prominent, aromas and flavors of roast become clearly evident. Little, if any, origin character remains. |

It is noted that the text of the above table was slightly modified from the original in Wikipedia.

Coffee Roasts from Light to Dark (By Brian Lokker. Published Apr. 5, 2013, last updated Jan. 4, 2017) states the following:

The most common way to describe coffee roast levels is by the color of the roasted beans, ranging from light to dark (or extra dark). As coffee beans absorb heat in the roasting process, their color becomes darker. Oils appear on the surface of the beans at higher temperatures. Because coffee beans vary, color is not an especially accurate way of judging a roast. But combined with the typical roasting temperature that yields a particular shade of brown, color is a convenient way to categorize roasting levels.

Thus, it is known in the art that darker roasted coffee been exhibit a more intense brown color.

Galactomannans

Galactomannans are described by Wikipedia as polysaccharides consisting of a mannose backbone with galactose side groups (more specifically, a (1-4)-linked beta-D-mannopyranose backbone with branchpoints from their 6-positions linked to alpha-D-galactose, (i.e. 1-6-linked alpha-D-galactopyranose).

Melanoidins

Melanoidins are generally defined as macromolecular, nitrogenous, brown-colored Maillard reaction end-products.

Green coffee beans include, on a dry matter basis, carbohydrates, lipids, proteins, chlorogenic acids, and other materials. During the roasting process, amino acids and carbohydrates combine to form melanoidins.

Melanoidins are not unique to roasted coffee. Roasting or pyrolysis of other plant matter (e.g. grains) also produces melanoidins. The melanoidins from coffee beans are identifiable as "coffee melanoidins" (or coffee melanoidin pigments since they are also pigments) based on the amino acid and carbohydrate profile of coffee beans, which differs from that of other plant matter (e.g. grains).

Melanoidins may thus be characterized based on their amino acid and/or carbohydrate profile. Furthermore, melanoidins may be characterized based on their molecular weight. Generally speaking, the greater the degree of roasting the coffee beans, the higher the molecular weight of the resulting melanoidins. Both light-roasted and heavy-roasted coffee beans contain both low molecular weight melanoidins' (defined in the literature has having a molecular weight of at most 3 kilodaltons (kDa)) and 'high molecular weight melanoidins' (defined in the literature as having a molecular weight of at least 12 kilodaltons (kDa)).

Generally speaking, the greater the degree of roasting, the higher the average molecular weight of the melanoidins that are formed.

It is possible to distinguish (in one non-limiting example, based on absorption spectrum at multiple wavelengths) between solutions sourced from light-roast coffee beans and solutions sourced from dark-roast cofeee beans. See, for example, the 1998 PhD thesis entitled COFFEE BREW MELANOIDINS: Structural and Functional Properties of Brown-Colored Coffee Compounds by E. Koen Bekedam (Ph.D. thesis Wageningen University, The Netherlands, 2008).

Printing on a Beverage (e.g. Foamed Beverage)

The following documents relate to printing on a beverage and are each incorporated by reference in their entirety: US 20080226783; US 20090202686; US 20090317519; US 20100291278; US 20150147444; US 20170066252; US WO2005069729; WO2007013061; WO2008047347; and WO2017221077.

Absorbance

The term "absorbance" is defined in Wikipedia as follows:

In chemistry, absorbance or decadic absorbance is the common logarithm of the ratio of incident to transmitted radiant power through a material, and spectral absorbance or spectral decadic absorbance is the common logarithm of the ratio of incident to transmitted spectral radiant power through a material.[2] Absorbance is dimensionless, and in particular is not a length, though it is a monotonically increasing function of path length, and approaches zero as the path length approaches zero. The use of the term "optical density" for absorbance is discouraged.[2] In physics, a closely related quantity called "optical depth" is used instead of absorbance: the natural logarithm of the ratio of incident to transmitted radiant power through a material. The optical depth equals the absorbance times ln(10).

The term absorption refers to the physical process of absorbing light, while absorbance does not always measure absorption: it measures attenuation (of transmitted radiant power). Attenuation can be caused by absorption, but also reflection, scattering, and other physical processes.

SUMMARY

The disclosed embodiments relate to apparatuses for printing with ink, i.e., ink-jet printing apparatuses, and especially to ink-jet printing apparatuses for printing images on beverages, as well as to methods for printing, formulations for suitable inks and methods of manufacturing and using said inks.

According to embodiments disclosed herein, a method of printing with coffee-based ink comprises: (a) providing a thermal ink-jet cartridge and a quantity of a coffee-based ink disposed within the thermal ink-jet cartridge; (b) receiving: (i) into a digital computer, (ii) from a user, and (iii) via a touch-screen computerized interface, optical density data describing an optical density of the coffee-based ink that is present within an ink-jet pod; (c) operating the digital computer to compute, from received the optical density data, a customized droplet-size for the coffee-based ink in its current state within the thermal ink-jet cartridge, the computing being performed such that in response to received optical density data indicating that the coffee-based ink has a lower (higher) optical data density, the digital computer computes a larger (smaller) target drop-size; (d) operating the digital computer to select electrical pulse parameters that target the customized droplet size; and (e) operating the thermal ink-jet cartridge according to the selected electrical pulse parameters to deposit droplets of the coffee-based ink onto a surface of a foamed beverage to form an ink-image thereon, where a size of deposited droplets matches the computed customized droplet-size.

In some embodiments, the optical density data received via the touch-screen computerized interface can be a 1:90 420 nm absorbance of the coffee-based ink.

According to embodiments disclosed herein, a printing apparatus for forming a design comprises (a) an elevatable tray having a beverage-support surface; (b) an electrical motor for raising or lowering the elevatable tray; (c) a quantity of a coffee-based ink; (d) an ink-jet printer loaded with a thermal ink-jet cartridge, the quantity of coffee-based ink disposed within the thermal ink-jet cartridge, the elevatable tray disposed under the ink-jet cartridge so that the ink-jet printer is configured to deposit droplets of the coffee-based ink onto an upper surface of a beverage that is disposed on the elevatable tray to form the design on the beverage upper surface; (e) a camera for acquiring images of the designs, that are (i) formed by the ink-jet printer (ii) using the coffee-based ink and (iii) on the beverage upper surfaces; (f) image-processing circuitry for analyzing the images of the designs acquired by the camera, the image-processing configured to detect malfunctioning nozzle(s) of the ink-jet cartridge; and (g) a nozzle compensation module responsive to output of the image-processing circuitry, the nozzle compensation module being configured to algorithmically pre-process digital images to be printed by the ink-jet printer in accordance with a detected presence and/or location of malfunctioning nozzle(s) so as to minimize a visibility of artifacts within the prints images due to the malfunctioning nozzle(s).

In some embodiments, the artifacts can include unprinted or white vertical lines in the image.

In some embodiments, the artifacts can include formations produced by deflected droplets that are ejected by malfunctioning nozzles.

In some embodiments, it can be that (A) the image-processing is further configured to both estimate, from the images of the designs acquired by the camera, an optical density of the coffee-based ink in its current state; and (B) the system further comprises a droplet size-regulation module responsive to output of the image-processing circuitry, the droplet-size regulation circuitry being configured to regulate a size of droplets of coffee-based ink by controlling, in accordance with the output of the image-processing circuitry, a pulse voltage and/or pulse duration employed by the thermal ink-jet cartridge.

In some embodiments, it can be that the droplet size-regulation module responds to a determination, by the image-processing circuitry, that previously-printed designs had insufficient optical density, by controlling a pulse voltage and/or duration of the ink-jet to increase a droplet size relative to previously-produced droplet.

According to embodiments disclosed herein, an edible aqueous coffee-based ink formulation comprises: coffee melanoidin sub-micron pigments suspended within the ink formulation; dissolved galactomannans that are dissolved within the ink formulation; and a pH control agent for maintaining a pH of the ink formulation between 3.7 and 4.5, wherein the aqueous coffee-based ink formulation has one or more of properties A-L the properties being defined as follows: according to property A, a 1:90 420 nm absorbance of the aqueous coffee-based ink formulation is at least 0.9 or at least 0.92 or at least 0.94 or at least 0.96 or at least 0.98 or at least 1.0; according to property B, when citric acid is added to the aqueous coffee-based ink formulation to reduce a pH thereof by 0.25, a 1:90 420 nm absorbance of pH-reduced aqueous coffee-based ink formulation decreases by at least 10%; according to property C, a static surface tension of the aqueous coffee-based ink formulation is at least 34 dynes/cm or at least 36 dynes/cm or at least 38 dynes/cm or at least 40 dynes/cm at 25° C.; according to property D, a 25° C. dynamic viscosity of the aqueous coffee-based ink formulation is between 3.0 and 5.0 cP; according to property E, a wt/wt % solids of the aqueous coffee-based ink formulation is between 20% and 35%; according to property F, (i) a ratio between a concentration of LMw coffee melanoidins in the aqueous coffee-based ink formulation and a concentration of HMw coffee melanoidins in the aqueous coffee-based ink formulation is at least 0.05 or at least 0.1 or at least 0.15 or at least 0.2 or at least 0.25 or at least 0.3 or at least 0.35 or at least 0.4; (ii) LMw coffee melanoidins are defined as coffee melanoidins whose molecular weight is at most 3 kilodaltons (kDa); (iii) LMw coffee melanoidins are defined as coffee melanoidins whose molecular weight is at least 12 kilodaltons (kDa); according to property G, the melanoidin sub-micron pigments are a primary colorant of the aqueous coffee-based ink formulation; according to property H, after the ink formulation is allowed sit for 2 weeks at room temperature conditions, an 1:90 420 nm absorbance decreases by no more than 30% or no more than 25% or no more than 20% or no more than 15% or no more than 10% or no more than 5%; according to property I, after the ink formulation is allowed sit for 2 weeks at room temperature conditions to form a 2-weeks-aged ink formulation, a 1:90 420 nm absorbance of the 2-weeks-aged ink formulation is at least 0.8 or at least 0.82 or at least 0.84 or at least 0.86 or at least 0.88 or at least 0.9 or at least 0.92 or at least 0.94 or at least 0.96 or at least 0.98 or at least 1.0; according to property J, at least 50% wt/wt or at least 75% wt/wt or at least 90% wt/wt or at least 95% wt/wt or at least 99% wt/wt of the melanoidins sub-micron pigments are sub-200 nm particles; according to property K, the melanoidins sub-micron pigments are the primary colorant of the aqueous coffee-based ink formulation; and according to property L, the aqueous coffee-based ink formulation is sourced primarily from light-roast coffee beans.

In some embodiments, the aqueous coffee-based ink formulation has at least property A. the aqueous coffee-based ink formulation has at least property B. In some embodiments, the aqueous coffee-based ink formulation has at least property C. In some embodiments, the aqueous coffee-based ink formulation has at least property D. In some embodiments, the aqueous coffee-based ink formulation has at least property E. In some embodiments, the aqueous coffee-based ink formulation has at least property F. In some embodiments, the aqueous coffee-based ink formulation has at least property G. In some embodiments, the aqueous coffee-based ink formulation has at least property H. In some embodiments, the aqueous coffee-based ink formulation has at least property I. In some embodiments, the aqueous coffee-based ink formulation has at least property J. In some embodiments, the aqueous coffee-based ink formulation has at least property K.

In some embodiments, the suspended coffee melanoidin sub-micron pigments can comprise at least 2% wt/wt or at least 3% wt/wt or at least 4% wt/wt or at least 5% wt/wt or at least 6% wt/wt of the edible aqueous coffee-based ink formulation.

In some embodiments, the suspended coffee melanoidin sub-micron pigments can comprise at most 15% wt/wt or at most 10% wt/wt or at most 8% wt/wt or at most 7% wt/wt of the edible aqueous coffee-based ink formulation.

In some embodiments, at least 90% wt/wt or at least 95% wt/wt or at least 99% wt/wt or at least 99.9% wt/wt of the suspended coffee melanoidin sub-micron pigments can be sub-400 nm particles.

In some embodiments, the edible aqueous coffee-based ink formulation can comprise at least 1% wt/wt dissolved galactomannans that are dissolved within the ink formulation.

In some embodiments, the dissolved galactomannans can comprise between 1% wt/wt and 10% wt/wt or between 1% wt/wt and 9% wt/wt or between 1% wt/wt and 8% wt/wt or between 1% wt/wt and 7% wt/wt or between 1% wt/wt and 6% wt/wt or between 1% wt/wt and 5% wt/wt or between 1% wt/wt and 4% wt/wt or between 1% wt/wt and 3% wt/wt of the edible aqueous coffee-based ink formulation.

In some embodiments, the dissolved galactomannans can comprise between 2% wt/wt and 10% wt/wt or between 2% wt/wt and 9% wt/wt or between 2% wt/wt and 8% wt/wt or between 2% wt/wt and 7% wt/wt or between 2% wt/wt and 6% wt/wt or between 2% wt/wt and 5% wt/wt or between 2% wt/wt and 4% wt/wt or between 2% wt/wt and 3% wt/wt of the edible aqueous coffee-based ink formulation.

In some embodiments, the dissolved galactomannans can comprise between 3% wt/wt and 10% wt/wt or between 3% wt/wt and 9% wt/wt or between 3% wt/wt and 8% wt/wt or between 3% wt/wt and 7% wt/wt or between 3% wt/wt and 6% wt/wt or between 3% wt/wt and 5% wt/wt or between 3% wt/wt and 4% wt/wt of the edible aqueous coffee-based ink formulation.

In some embodiments, the dissolved galactomannans can comprise between 4% wt/wt and 10% wt/wt or between 4% wt/wt and 9% wt/wt or between 4% wt/wt and 8% wt/wt or between 4% wt/wt and 7% wt/wt or between 4% wt/wt and 6% wt/wt or between 4% wt/wt and 5% wt/wt of the edible aqueous coffee-based ink formulation.

In some embodiments, the dissolved galactomannans can comprise between 5% wt/wt and 10% wt/wt or between 5% wt/wt and 9% wt/wt or between 5% wt/wt and 8% wt/wt or between 5% wt/wt and 7% wt/wt or between 5% wt/wt and 6% wt/wt of the edible aqueous coffee-based ink formulation.

In some embodiments, wherein the pH control agent for maintaining a pH of the ink formulation between 3.7 and 4.4 or between 3.7 and 4.3 or between 3.7 and 4.2 or between 3.7 and 4.1 or between 3.7 and 4.3 or between 3.7 and 4.2 or between 3.7 and 4.1 or between 3.7 and 4. In some embodiments, wherein the pH control agent for maintaining a pH of the ink formulation between 3.8 and 4.4 or between 3.8 and 4.3 or between 3.8 and 4.2 or between 3.8 and 4.1 or between 3.8 and 4.3 or between 3.8 and 4.2 or between 3.8 and 4.1 or between 3.8 and 4. In some embodiments, wherein the pH control agent for maintaining a pH of the ink formulation between 3.9 and 4.4 or between 3.9 and 4.3 or between 3.9 and 4.2 or between 3.9 and 4.1 or between 3.9 and 4.3 or between 3.9 and 4.2 or between 3.9 and 4.1 or between 3.9 and 4. In some embodiments, wherein the pH control agent for maintaining a pH of the ink formulation between 4.0 and 4.4 or between 4.0 and 4.3 or between 4.0 and 4.2 or between 4.0 and 4.1 or between 4.0 and 4.3 or between 4.0 and 4.2 or between 4.0 and 4.1. In some embodiments, wherein the pH control agent for maintaining a pH of the ink formulation between 4.1 and 4.4 or between 4.1 and 4.3 or between 4.1 and 4.2. In some embodiments, wherein the pH control agent for maintaining a pH of the ink formulation between 4.2 and 4.4 or between 4.2 and 4.3.

In some embodiments, the 1:90 420 nm absorbance of the aqueous coffee-based ink formulation can be at most 1.5 or at most 1.4 or at most 1.3 or at most 1.2 or at most 1.1 or at most 1.01.

In some embodiments, it can be that when citric acid is added to the aqueous coffee-based ink formulation to reduce a pH thereof by 0.25, a 1:90 420 nm absorbance of pH-reduced aqueous coffee-based ink formulation decreases by at least 15% or at least 20% or at least 25% or at least 30%.

In some embodiments, a static surface tension of the aqueous coffee-based ink formulation can be at most 60 dynes/cm or at most 58 dynes/cm or at most 56 dynes/cm or at most 54 dynes/cm or at most 52 dynes/cm or at most 50 dynes/cm or at most 48 dynes/cm or at most 46 dynes/cm or at most 44 dynes/cm at 25° C.

In some embodiments, the 25° C. dynamic viscosity of the aqueous coffee-based ink formulation can be between 3.0 and 4.8 cP. In some embodiments, the 25° C. dynamic viscosity of the aqueous coffee-based ink formulation can be between 3.0 and 4.6 cp. In some embodiments, the 25° C. dynamic viscosity of the aqueous coffee-based ink formulation can be between 3.0 and 4.5 cP. In some embodiments, the 25° C. dynamic viscosity of the aqueous coffee-based ink formulation can be between 3.0 and 4.4 cP. In some embodiments, the 25° C. dynamic viscosity of the aqueous coffee-based ink formulation can be between 3.0 and 4.3 cP. In some embodiments, the 25° C. dynamic viscosity of the aqueous coffee-based ink formulation can be between 3.0 and 4.2 cP. the 25° C. dynamic viscosity of the aqueous coffee-based ink formulation can be between 3.2 and 4.8 cP. In some embodiments, the 25° C. dynamic viscosity of the aqueous coffee-based ink formulation can be between 3.2 and 4.6 cp. In some embodiments, the 25° C. dynamic viscosity of the aqueous coffee-based ink formulation can be between 3.2 and 4.5 cP. In some embodiments, the 25° C. dynamic viscosity of the aqueous coffee-based ink formulation can be between 3.2 and 4.4 cP. In some embodiments, the 25° C. dynamic viscosity of the aqueous coffee-based ink formulation can be between 3.2 and 4.3 cP. In some embodiments, the 25° C. dynamic viscosity of the aqueous coffee-based ink formulation can be between 3.2 and 4.2 cP. In some embodiments, the 25° C. dynamic viscosity of the aqueous coffee-based ink formulation can be between 3.4 and 4.8 cP. In some embodiments, the 25° C. dynamic viscosity of the aqueous coffee-based ink formulation can be between 3.4 and 4.6 cp. In some embodiments, the 25° C. dynamic viscosity of the aqueous coffee-based ink formulation can be between 3.4 and 4.5 cP. In some embodiments, the 25° C. dynamic viscosity of the aqueous coffee-based ink formulation can be between 3.4 and 4.4 cP. In some embodiments, the 25° C. dynamic viscosity of the aqueous coffee-based ink formulation can be between 3.4 and 4.3 cP. In some embodiments, the 25° C. dynamic viscosity of the aqueous coffee-based ink formulation can be between 3.4 and 4.2 cP. In some embodiments, the 25° C. dynamic viscosity of the aqueous coffee-based ink formulation can be between 3.6 and 4.8 cP. In some embodiments, the 25° C. dynamic viscosity of the aqueous coffee-based ink formulation can be between 3.6 and 4.6 cp. In some embodiments, the 25° C. dynamic viscosity of the aqueous coffee-based ink formulation can be between 3.6 and 4.5 cP. In some embodiments, the 25° C. dynamic viscosity of the aqueous coffee-based ink formulation can be between 3.6 and 4.4 cP. In some embodiments, the 25° C. dynamic viscosity of the aqueous coffee-based ink formulation can be between 3.6 and 4.3 cP. In some embodiments, the 25° C. dynamic viscosity of the aqueous coffee-based ink formulation can be between 3.6 and 4.2 cP. In some embodiments, the 25° C. dynamic viscosity of the aqueous coffee-based ink formulation can be between 3.8 and 4.8 cP. In some embodiments, the 25° C. dynamic viscosity of the aqueous coffee-based ink formulation can be between 3.8 and 4.6 cp. In some embodiments, the 25° C. dynamic viscosity of the aqueous coffee-based ink formulation can be between 3.8 and 4.5 cP. In some embodiments, the 25° C. dynamic viscosity of the aqueous coffee-based ink formulation can be between 3.8 and 4.4 cP. In some embodiments, the 25° C. dynamic viscosity of the aqueous coffee-based ink formulation can be between 3.8 and 4.3 cP. In some embodiments, the 25° C. dynamic viscosity of the aqueous coffee-based ink formulation can be between 3.8 and 4.2 cP.

In some embodiments, it can be that after the ink formulation is allowed sit for 2 weeks at room temperature conditions to form a 2-weeks-aged ink formulation, a 1:90 420 nm absorbance of the 2-weeks-aged ink formulation is at most 1.4 or at most 1.3 or at most 1.2 or at most 1.1 or at most 1.01.

In some embodiments, the edible aqueous coffee-based ink formulation can comprise at most 1% wt/wt carmel dye or being free of carmel dye.

In some embodiments, at least 50% wt/wt or at least 70% wt/wt or at least 90% wt/wt of the coffee melanoidin sub-micron pigments can be sub-300 nm particles. In some embodiments, at least 50% wt/wt or at least 70% wt/wt or at least 90% wt/wt of the coffee melanoidin sub-micron pigments can be sub-200 nm particles. In some embodiments, at least 50% wt/wt or at least 70% wt/wt or at least 90% wt/wt of the coffee melanoidin sub-micron pigments can be sub-150 nm particles.

In some embodiments, the aqueous coffee-based ink formulation can have at least property L.

In some embodiments, the aqueous coffee-based ink formulation can further comprise a humectant.

In some embodiments, the humectant can be selected from a list consisting of bee honey, date honey, maple syrup, molasses, cane sugar syrup, propylene glycol, hexylene glycol, butylene glycol, polyethylene glycol 200, polyethylene glycol 400, polyethylene glycol 600, alpha hydroxy acids [e.g lactic acid], egg yolk, egg white, glyceryl triacetate, lithium chloride, molsses, glucose, mannitol, sucrose, dextrose, fructose, Polymeric polyols such as polydextrose, *Quillaia*, Sodium hexametaphosphate E452i, sugar alcohos (sugar polyols) such as glycerol, sorbitol, xylitol, maltitol or mixtures thereof, or preferably bee honey.

In some embodiments, the aqueous coffee-based ink formulation can have a degrees Brix (° Bx) at least 25 or at least 26 or at least 28 or at least 30 or at least 32. In some embodiments, the aqueous coffee-based ink formulation can have a degrees Brix (° Bx) at most 42 or at most 40 or at most 38 or at most 36 or at most 34.

A method is disclosed herein for manufacturing an aqueous coffee-based ink formulation. The method comprises: (a) contacting coffee beans comprising light-roast coffee beans with an aqueous solution so that coffee melanoidin sub-micron pigments sourced from the beans migrate therefrom into the aqueous solution; (b) increasing a concentration of the coffee melanoidin sub-micron pigments within the aqueous solution to increase both a viscosity and a 420 nm absorbance thereof; (c) subjecting the aqueous solution to a separations process which both decreases the concentration of the coffee melanoidin sub-micron pigments within the aqueous solution and increases a ratio between (i) a concentration of LMw coffee melanoidins and (ii) a concentration of HMw coffee melanoidins, thereby reducing a viscosity of the aqueous solution; and (d) controlling a pH of the aqueous solution to a value of between in the 3.5-4.5 pH range, wherein the methods is performed so that to produce the aqueous coffee-based ink formulation of any of claims 1-70 and wherein LMw coffee melanoidins are defined as coffee melanoidins whose molecular weight is at most 3 kilodaltons (kDa); (iii) LMw coffee melanoidins are defined as coffee melanoidins whose molecular weight is at least 12 kilodaltons (kDa).

According to embodiments, an article of manufacture can comprise an ink-jet cartridge, the ink-jet cartridge being loaded with any of the formulations disclosed herein. In some such embodiments, the ink-jet cartridge can be a thermal ink-jet cartridge.

A method of printing is disclosed, comprising: providing aqueous coffee-based ink formulation of any of claims 1-70; and forming an image (e.g. by a computer-controlled printer such as an ink-jet printer) by depositing droplets of the aqueous coffee-based ink formulation of any of claims 1-70 on a target substrate such as foamed beverage.

BRIEF DESCRIPTION OF THE FIGURES

The invention will now be described further, by way of example, with reference to the accompanying drawings, in which the dimensions of components and features shown in the figures are chosen for convenience and clarity of presentation and not necessarily to scale. In the drawings:

FIGS. 5, 6 and 7 show flowcharts of methods of manufacturing an aqueous coffee-based ink formulation, according to embodiments of the present invention.

DETAILED DESCRIPTION OF THE ILLUSTRATED EMBODIMENTS

Figure 1:
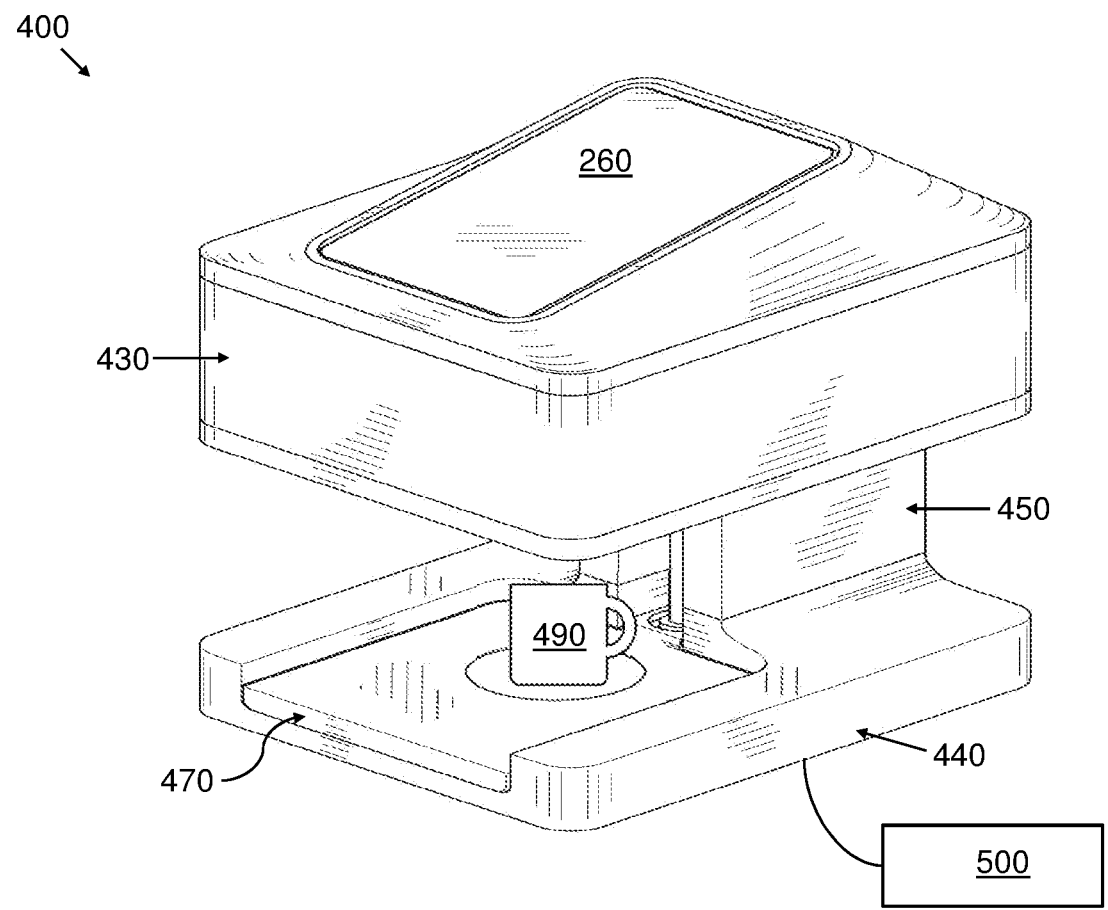
FIG. 1 is a schematic perspective view of a printing apparatus according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

When printing on a beverage using a coffee-based ink, it may be useful to (i) manufacture the coffee-based ink according to the methods disclosed hereinbelow with respect to any one of FIGS. 1-3 and to (ii) subsequently load the coffee-based ink into a thermal ink-jet cartridge.

In certain business scenarios, such inks are not always available. In one example, a restaurant or bar is required (e.g. for marketing reasons) to source some of their inks from particular coffee beans or from a particular roast in order to promote the particular bean or roast. While the promoted bean or roast might be an excellent product for producing coffee beverages, the resulting ink might have one or more undesirable properties, for the purpose of ink-jet printing, especially if the pH is below 4.5. One example of such an undesirable property is insufficient optical density optical. Another example of such an undesirable property is malfunctioning nozzles that suffer from droplet-deflection or clogging.

Insufficient Optical Density

Embodiments of the invention are useful for situations where a particular ink-jet printer is not always loaded with the same ink—sometimes inks of higher optical densities are used, and at other times inks of lower optical densities are used.

One way to overcome the challenge associated with lower optical densities is to print using larger droplets—e.g. see US pre-grant patent application 2010/0110132, incorporated herein by reference. The larger droplet increases the amount of colorant delivered per droplet, thereby compensating for the lower optical density of the ink.

In one use-case, each ink-jet cartridge containing coffee-based ink is labeled (e.g. a sticker is applied to the outside of the ink-jet cartridge) with a number representing the optical density of the coffee-based ink disposed within the ink-jet cartridge. For example, this number may be the 1:90 420 nm absorbance of the ink formulation.

When the cartridge is loaded into the ink-jet printer, the barista may read this number and input this optical density number to the ink-jet printer via a touch-screen interface. This optical density number is then translated into an instruction to the thermal ink-jet printer to either print using larger droplets or using smaller droplets. For example, the pulse voltage or pulse duration may be controlled so as to regular the droplet see—see for example, US 2010/011013.

The ink-jet printer responds to a lower number (i.e. less optical density—this is undesirable) by compensating. In particular, larger droplets are used.

Conversely, the ink-jet printer responds to a higher number (i.e. greater optical density—this is desirable) by using smaller droplets. For example, these smaller droplets may be preferred so as to avoid 'damaging' the ink pod by inducing coagulation and/or causing heated ink to stick to the electrical resister within the ink-jet cartridge.

Returning to the use-case, we note that it is possible to label the ink-jet pods with an optical density of the coffee-based ink. When the thermal ink-jet cartridge is loaded (or any time thereafter) to the ink-jet printer, the barista can manually input this optical density (i.e. after simply reading it from the label on the ink-jet cartridge) via the touch screen interface. In response to received optical density data indicating that the coffee-based ink has a lower optical density, the digital computer computes a larger target drop-size, and the larger droplets are deposited during the ink-jet printing. Conversely, in response to received optical density data indicating that the coffee-based ink has a lower optical density, the digital computer computes a larger target drop-size, and the larger droplets are deposited during the ink-jet printing.

Figure 2:
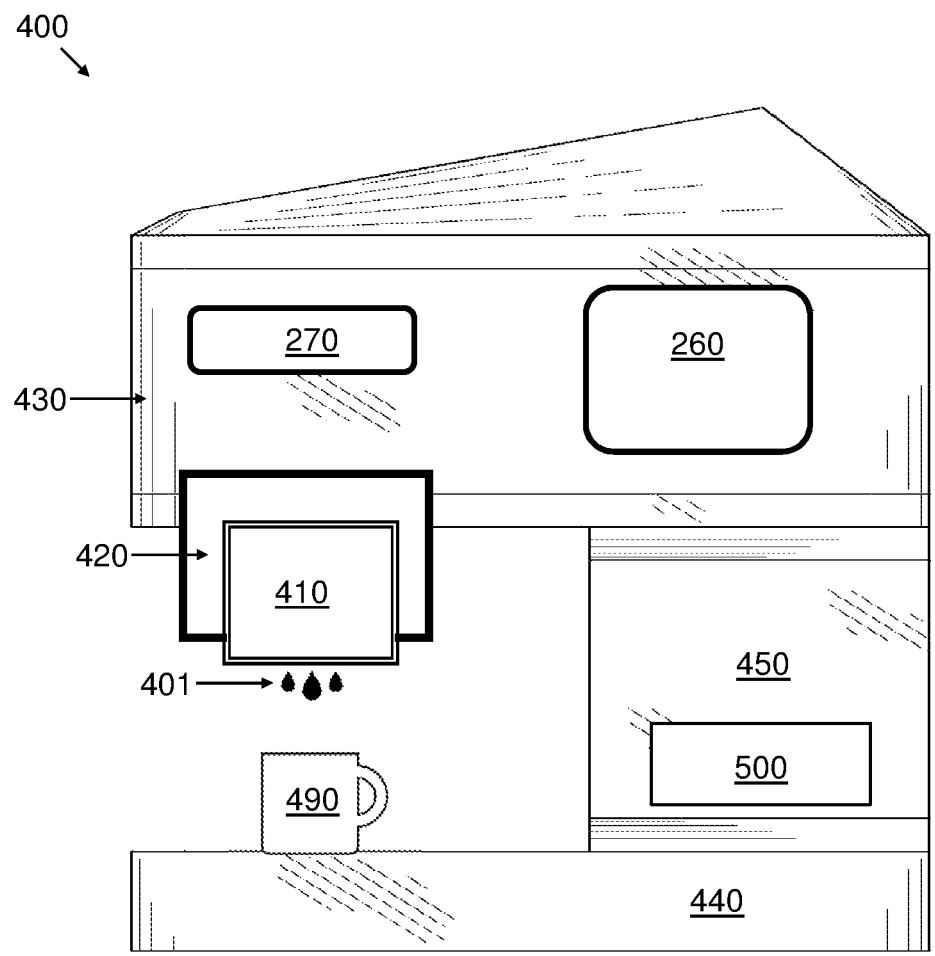
FIGS. 2 and 3 are schematic side views of printing apparatuses according to embodiments of the present invention.
Figure 3:
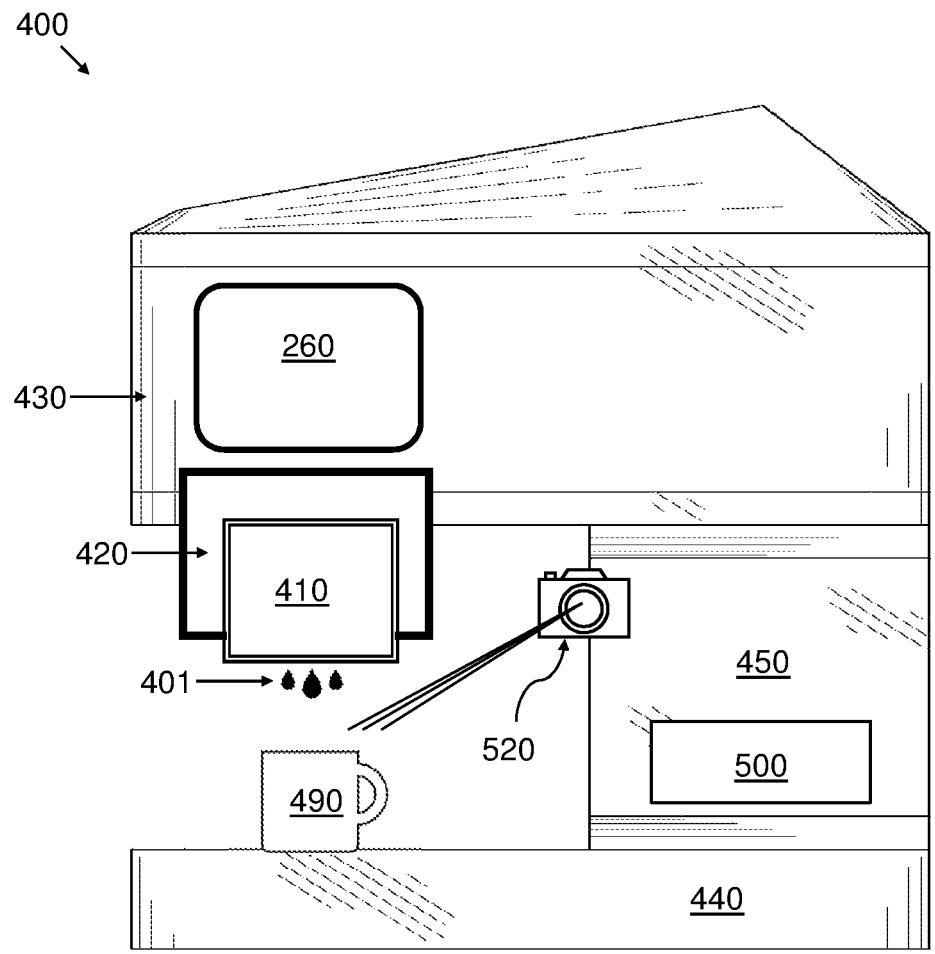

FIGS. 1, 2 and 3 show non-limiting examples of beverage-printing apparatuses 400 according to various embodiments.

Referring now to FIG. 1, an apparatus 400 for printing on a beverage 490 includes a base 440, an upper horizontal element 430 housing an ink-jet cartridge port 420 (shown in FIG. 2) and a user interface device 260. The beverage 490 can sit on a tray 470 that is elevated for raising the beverage 490 to a suitable or optimal elevation for printing thereupon. The upper horizontal element 430 is supported by a vertical element 450. The user interface device 260 can be a touch screen which accepts various user inputs. The user interface device 260 can be used by the user to use or display images to be printed on beverage 490, and can be used, for example, to input optical density data as described above. Computer 500, which can include any or all of the computer modules (e.g., software, hardware, and/or firmware, and/or data communications arrangements) referenced herein. The computer 500 is shown schematically as being connected to the printing apparatus 400, but it can be placed anywhere suitable including inside the printing apparatus 400 (as illustrated in the example of FIG. 2), or elsewhere within the business from wherever it can communicate wirelessly with the printing apparatus 400.

FIG. 2 is a schematic illustration of a printing apparatus having the same basic physical elements of the apparatus 400 of FIG. 1. In the case of FIG. 2, a second user interface device 270 is shown; this can include, for example, a scanner for scanning a label from a coffee-based ink cartridge which may include, inter alia, optical density data of the coffee-based ink contained within the cartridge, or (additionally or alternatively) a screen specifically adapted to receive user inputs regarding ink optical density data. Ink cartridge port 420 is shown with an ink cartridge 410 loaded and printing an image (not shown) on beverage 490 using ink droplets 401.

Multi-module apparatus including one or both of a nozzle compensation module and a droplet-size control module As explained above, sometimes a given ink-jet printer uses a variety of inks at different times—some of higher quality and some of lower quality.

Unfortunately, in contrast to inks based on artificial colorants (e.g. artificial dyes), it is may difficult to obtain natural coffee-based inks with both higher optical density and better resilience to nozzle malfunctions, especially if there is a need to employ low-pH inks, for example in order to prevent or retard microbe growth.

Embodiments of the invention relate to a printing system that provides multiple remedies to insufficient optical density and nozzle clogging or malfunction. The system includes all of the following—(i) a camera and image processing module for automatically detecting defects in printed images, due to insufficient optical density or nozzle malfunction; (ii) a nozzle compensation module for algorithmically modifying digital images so that the resulting image, printed on an upper surface of the beverage, more closely resembles a desired image in appearance; and (iii) droplet-size control circuitry (i.e. responsive for instructing the machine to print either in a first mode where droplets are larger or in a second mode where droplets are smaller.

The nozzle compensation module may employ any technique or algorithm employed in the art, including but not limited to those disclosed by the following patent documents, each of which is incorporated by reference: (i) US 2019/0070848; (ii) U.S. Pat. No. 9,010,898; (iii) US 2016/144613; (iv) U.S. Pat. No. 7,165,824; (v) U.S. Pat. No. 7,085,002; (vi) U.S. Pat. No. 7,607,752; (vii) U.S. Pat. No. 7,585,038, (viii) U.S. Pat. No. 7,533,953; and (ix) US 20190134990.

Both of the nozzle-compensation module and the droplet-size control circuitry are responsive to the output of the image-processing module. Thus, in contrast to embodiments where the barista must manually input optical density data via a touch screen interface, in some embodiments defective nozzles and/or images formed droplets of insufficient optical density are detected. The system handles both of the following situations, due to the fact that a suitable coffee-based ink is not always available—(i) insufficient optical density and (ii) malfunctioning nozzles.

FIG. 3 is a schematic illustration of a printing apparatus having the same basic physical elements of the apparatus 400 of FIG. 2. In the case of FIG. 3, imaging apparatus 520 is suitably installed for imaging the image (not shown) printed on beverage 490. Image processing and/or nozzle compensation modules may be installed within computer 500, or within the imaging apparatus 520 itself, or in any other suitable location to and from which data can be efficiently transferred for analysis.

Figure 4:
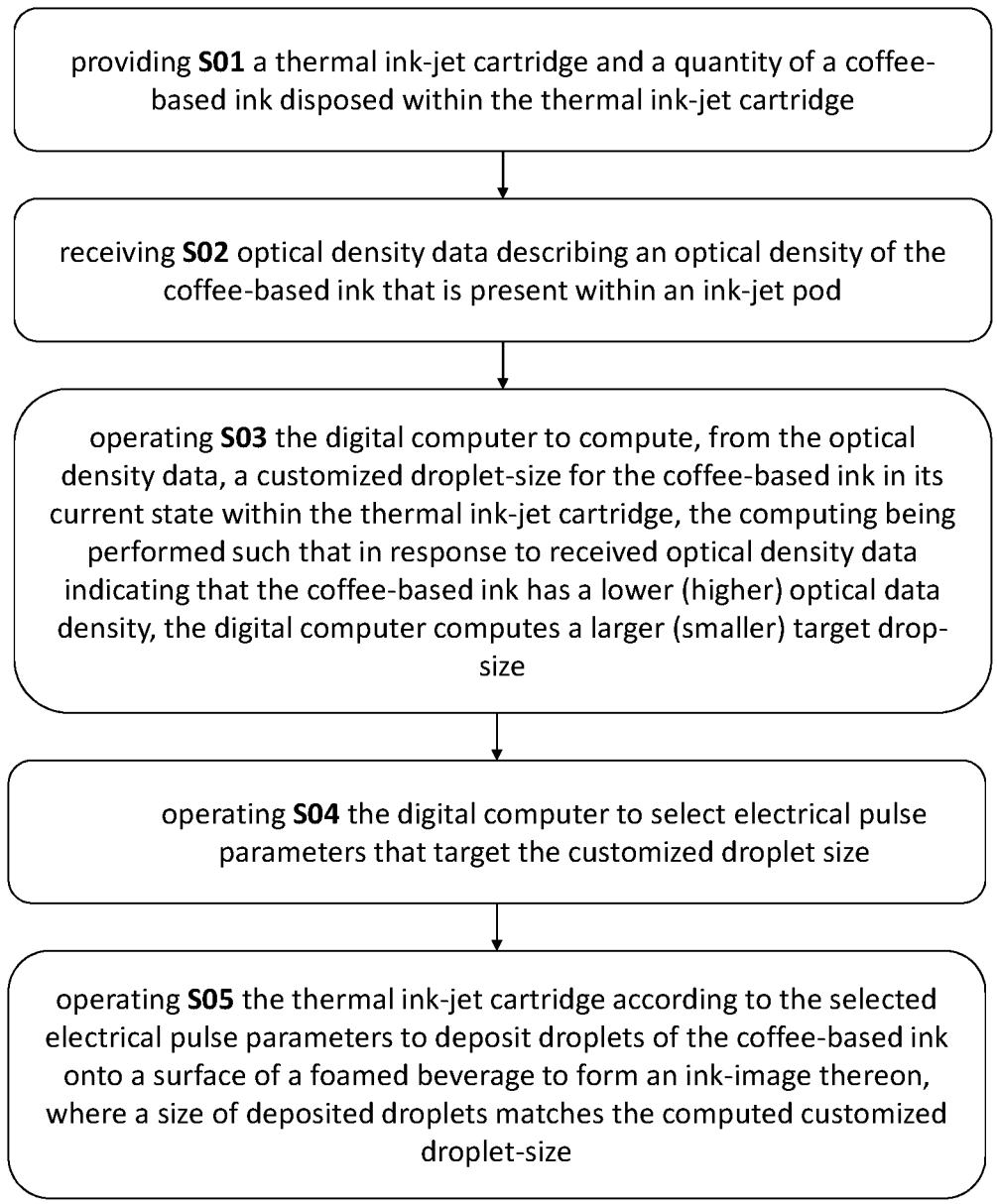
FIG. 4 shows a flowchart of a method of printing with coffee-based ink, according to embodiments of the present invention.

Referring now to FIG. 4, a flowchart of a method of printing with coffee-based ink 401 is shown, the method comprising:

Step S01, providing a thermal ink-jet cartridge 410 and a quantity of a coffee-based ink 401 disposed within the thermal ink-jet cartridge 410.

Step S02, receiving optical density data describing an optical density of the coffee-based ink 401 that is present within an ink-jet pod 410. The receiving is from by a digital computer 500, via a touchscreen interface 260, from a user.

Step S03, operating the digital computer 500 to compute, from the optical density data, a customized droplet-size for the coffee-based ink 401 in its current state within the thermal ink-jet cartridge 410, the computing being performed such that in response to received optical density data indicating that the coffee-based ink 401 has a lower (higher) optical data density, the digital computer 500 computes a larger (smaller) target drop-size Step S04, operating the digital computer 500 to select electrical pulse parameters that target the customized droplet size.

Step S05 operating the thermal ink-jet cartridge 410 according to the selected electrical pulse parameters to deposit droplets of the coffee-based ink 401 onto a surface of a foamed beverage 490 to form an ink-image thereon, where a size of deposited droplets matches the computed customized droplet-size.

Ink Attributes and Manufacturing

Feature of embodiments of the invention may be described in terms of a 1:90 x nm absorbance (e.g. in terms of a 1:90 420 nm absorbance).

For the present disclosure, a "1:90 diluted-test-formulation formed from a particular formulation" is obtained when the particular formulation is diluted 1:90 with deionized water.

For the present disclosure, a "1:90 x nm absorbance" of a particular formulation is defined as the absorbance at x nm of the "1:90 diluted-test-formulation formed from the particular formulation."

By way of example, a "1:90 420 nm absorbance" of a particular formulation is defined as the absorbance at 420 nm of the "1:90 diluted-test-formulation formed from the particular formulation."

Examples below relate to the case where the "particular formulation' is a coffee-based ink formulation.

Absorbance at Low pHs

Embodiments of the invention relate to an edible and aqueous coffee-based ink formulation which exhibits a relatively high absorbance at 420 nm (e.g. expressed in terms of a 1:90 420 nm absorbance) and is relatively stable (e.g. against flocculation and/or against mold growth when open to the atmosphere) even at pH values of at most 4.5 or at most 4.4 or at most 4.3 or at most 4.2.

Experiments performed by the present inventor have indicated that in coffee-based inks where coffee melanoidin sub-micron (e.g. sub-400 nm) pigments are the primary colorant, there is a potential tradeoff between (i) the need for a pH that is low enough to prevent growth of molds and (ii) the need for high absorbance at 420 nm, in a particular an absorbance that remains relatively stable over time (e.g. over weeks) and does not significantly decrease due to flocculation of the coffee melanoidin pigments. Embodiments of the invention relate to techniques for obtaining an ink that is both resistant to mold growth and has sufficiently high absorbance at 420 nm to print an ink-jet image (e.g. on or in a foamed beverage) that has a desirable optical density (e.g. in the foam).

Experiments performed by the present inventor indicate that during manufacture of the ink, sub-micron pigment Malliard particles obtained from roasted coffee beans may flocculate, thereby reducing the concentration of pigment Malliard particles in the final ink formulation, concomitantly reducing the 420 nm absorbance thereof. Furthermore, even in situations where the Malliard particles remain in the coffee-based edible colorant, flocculation may occur at a later time (e.g. within hours or days or a few weeks of when the colorant is loaded into an ink-jet cartridge), reducing the shelf-life of the ink.

Embodiments of the present invention relate to formulations, methods of manufacturing the same, ink-jet cartridges loaded with the same, and methods of ink-jet printing using the same which overcome this difficulty. In embodiments of the invention, the ink formulation (i) exhibits a relatively high 420 nm absorbance, even at a low pH or at most 4.3 or at most 4.2; and/or (ii) is able to sustain this relatively high absorbance (i.e. at 20° C., atmospheric pressure, 20% relative humidity) for an extended period of time of at least days or at least one week or at least two weeks or at least 3 weeks or at least one month.

The high 420 nm absorbance is primarily attributable to coffee melanoidin sub-micron (e.g. sub-400 nm) pigments suspended in the formulation, as opposed to a dye such as Carmel. In one example, adding sufficient citric acid to decrease the pH of the coffee-based edible colorant by 0.3 decreases the absorbance of the edible coffee-based ink formulation by at least 10% or at least 15% or at least 20% or at least 25%. In one example, adding sufficient citric acid to decrease the pH of the coffee-based edible colorant by 0.3 causes flocculation of coffee sub-micron particles so as to decrease a 420 nm absorbance of the edible coffee-based ink formulation by at least 10% or at least 15% or at least 20% or at least 25%.

Experiments performed by the present inventor indicate that in order to maximize absorbance of the coffee-based ink at low pH (e.g. at most 4.3 or at most 4.2) (in particular, the absorbance after the ink is allowed to sit for two weeks), it is paradoxically advantageous to manufacture this colorant from light-roasted coffee beans, rather than heavier roasted coffee beans which are known to exhibit a more intense brown color.

Not wishing to be bound by theory, the following is currently believed: even though higher molecular weight melanoidin have a more intense brown color than lower molecular melanoidins, higher molecular weight melanoidins are more prone to flocculation in aqueous coffee based colorant, especially at low pHs of at most 4.2 or at most 4.3—e.g. due to the greater hydrophobicity of the high molecular weight melanoidin and/or due to charge effects at the low pH which are different in low molecular weight melanoidins than in high molecular weight melanoidins (e.g. possibly due to different amino acid pKs).

Method for Manufacturing the Coffee-Based Colorant Formulation

An exemplary manufacturing technique for producing the aqueous coffee-based ink formulation is disclosed in FIG. 1.

The present inventor has identified certain challenges associated with manufacturing a coffee-based ink where coffee melanoidin sub-micron (e.g. sub-400 nm) pigments are the primary colorant. In particular, the present inventor has discovered that:

A. the greater the concentration of coffee melanoidin sub-micron (e.g. sub-400 nm) pigments in the ink, the greater the viscosity of the ink. It may be desired to limit the concentration of the coffee melanoidin nanoparticles in order to limit the viscosity thereof. If the viscosity is too high, the ink might have unacceptable jettability properties—e.g. for thermal ink-jet. Exacerbating the situation, it is often necessary to add a humectant (e.g. glycerol)—e.g. for the purpose of retaining moisture of the ink over days or weeks or months as the ink resides in an ink-jet cartridge (e.g. that is open to the atmosphere). A presence of the humectant would further increase the viscosity—therefore, the need for the humectant might further increase the need to limit the concentration of the coffee melanoidin nanoparticles within the ink formulation;

B. in many ink-jet applications (e.g. printing on a foamed beverage), it is desirable to produce images having a commercially desirable optical density. In the specific case of coffee-based ink where coffee melanoidin sub-micron (e.g. sub-400 nm) pigments are the primary colorant, this may entail manufacturing an ink having a relatively high absorbance at 420 nm. However, in order to achieve this goal, it may be necessary to produce an ink having a relatively high concentration of coffee melanoidins, which may increase the viscosity;

C. there is therefore a tradeoff between jettability and commercially desirable optical density of the resulting image.

Figure 5:
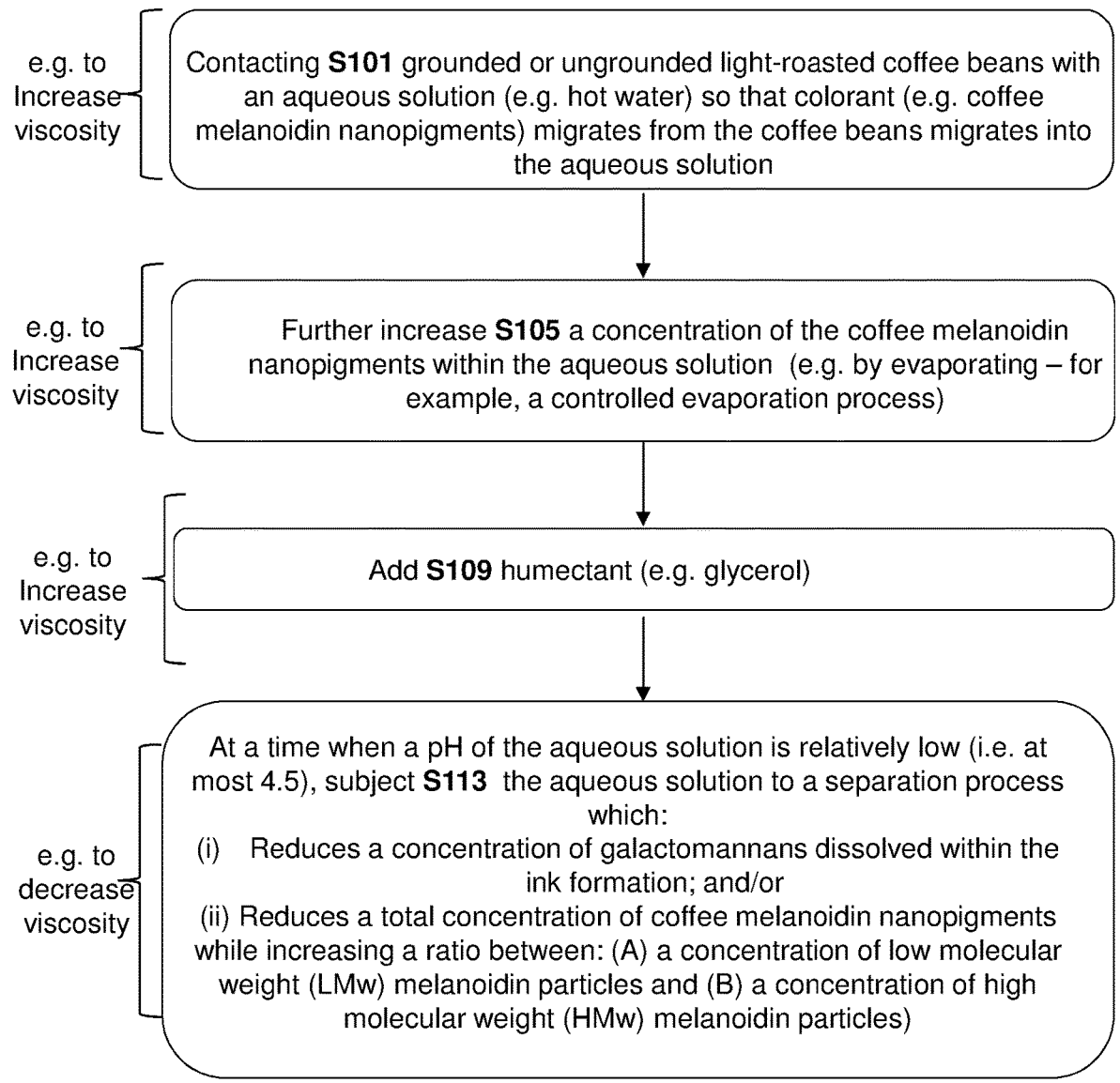

Embodiments of the invention, and FIG. 5 (in certain embodiments thereof) relate to novel manufacturing techniques for producing coffee-based ink that simultaneously achieve these potentially contradicting design goals.

In step S101, light roasted coffee beans (e.g. comprising Sumatra beans) (e.g. mostly or exclusively light roasted coffee beans) are brought into contact (e.g. by soaking the beans) with an aqueous solution (e.g. hot water) so that coffee melanoidin sub-micron (e.g. sub-400 nm) pigments (e.g. of Malliard particles) migrate from the coffee beans into the aqueous solution. The presence of these melanoidin sub-micron (e.g. sub-400 nm) pigments in the aqueous solution will increase the viscosity of the aqueous solution. For example, the host water may be pressurized (e.g. in a pressure cooker) at a temperature at least 105 degrees Celsius (e.g. around 110 degrees Celsius). For example, a duration of step S101 may be around 100 minutes.

In step S105, a concentration of the coffee melanoidin sub-micron (e.g. sub-400 nm) pigments within the aqueous is further increased (e.g. after the aqueous solution is no longer in contact with the coffee beans of step S101) (for example, by at least 10% or at least 20% or at least 50%)—e.g. by evaporating off or otherwise removing solvent (i.e. water) of the aqueous solution. For example, at least 5% or at least 10% or at least 20% of the solvent may be evaporated off.

Steps S101 and/or S105 may be repeated—e.g. cooling after each iteration of step S105.

In step S109, a humectant is added (e.g. glycerol). Furthermore, a pH controlling agent (e.g. lemon concentrate or citric acid or any other edible pH controlling agent) to reduce the pH may be added as well—e.g. before performing step S109 or simultaneously therewith or thereafter. The pH controlling agent may be added in a quantity that maintains the pH in a specific acidic range.

In different embodiments, an upper bound of this pH range may be 4.5 or 4.4 or 4.3 or 4.2 or 4.1. A lower bound of the pH range may be 3.5 or 3.6 or 3.7 or 3.8 or 3.9 or 4.0

Addition of the humectant in step S109 increases the viscosity of the aqueous solution which will eventually become the ink.

In step S113, when the pH of the aqueous solution is relatively low (e.g. in the aforementioned pH range or any pH range disclosed herein), the aqueous solution (e.g. the aqueous solution comprising coffee melanoidin sub-micron (e.g. sub-400 nm) pigments which will eventually become the coffee-based ink) is subjected to a separation process which:
 (i) Reduces a concentration of galactomannans dissolved within the ink formation; and/or
 (ii) Reduces a total concentration of coffee melanoidin sub-micron (e.g. sub-400 nm) pigments while increasing a ratio between:

(A) a concentration of low molecular weight (LMw) melanoidin particles and (B) a concentration of high molecular weight (HMw) melanoidin particles).

The separations of step S113 process may entail freezing and thawing. For example, when the aqueous solution is frozen (e.g. to a temperature of about −18 degrees Celsius), this may form a gel that is has an elevated concentration of galactomannans relative to material that is not in the gel. Removal of this gel and subsequent thawing may thus achieve the goal over reducing the concentration of galactomannans. In some embodiments, the aqueous solution may be subjected to more than one freezing and thawing cycle.

As will be discussed below, the present inventor believes that it is desirable to reduce a concentration of galactomannans when manufacturing the ink, for example, in order to improve performance in thermal ink-jet printers—e.g. to reduce an incident of and/or an observable extent of droplet deflection.

Alternatively or additionally, the separations process of FIG. 5 may be effective to reduce a total concentration of coffee melanoidin sub-400 nm pigments while increasing a ratio between:

(A) a concentration of low molecular weight (LMw) melanoidin particles and (B) a concentration of high molecular weight (HMw) melanoidin particles).

For example, there may be a tendency of melanoidin particles to concentrate in the gel which is removed in the context of step S113 (in some embodiments thereof) (e.g. removed from the container and disposed of). How much reduction of the concentration may depend on the size of the melanoidin particles—e.g in step S113 a greater fraction of HWm melanoidin particles may be removed from the aqueous solution (i.e. that will become the ink) than LMw melanoidin particles.

Not wishing to be bound by theory, the present inventor believes that the higher the molecular weight of melanoidin particles in the ink, the greater that risk of flocculation and the lower the shelf-life of the ink. Embodiments of the invention relate to the use of light-roast coffee beans in step S101 and/or the use of freezing and thawing in step S113 to obtain an ink having a relatively 'high' fraction of melanoidin particles that are LMw.

Step S113 reduces the viscosity of the formulation.

Synergy Between (i) the Use of Light-Roasted Coffee Beans in Step S101 and (ii) the Separations Process of Step S113 [First Example]—

In some embodiments, there is synergy between (i) the use of light-roasted coffee beans in step S101 and (ii) the separations process of step S113. For example, it may be desirable to produce a coffee-based ink formulation having a relatively high ratio between: (A) a concentration of low molecular weight (LMw) melanoidin particles and (B) a concentration of high molecular weight (HMw) melanoidin particles).

The reason for this may be related to viscosity limitations, which may require that the total concentration of melanoidin particles be limited. In order to maximize shelf-life, it may be desirable to produce an ink formulation having a relatively low average molecular weight of melanoidin particles—the lower the molecular weight, the less the risk of subsequent flocculation and the longer the shelf-life of the ink.

Therefore, even though higher molecular weight melanoidin particles are known to have a more intense brown colour than the lower molecular weight melanoidin particles, the latter may be preferred for stability reasons. Also, it is possible to include a greater number of particles while meeting viscosity constraints related to jettability.

Synergy Between (i) the Use of Light-Roasted Coffee Beans in Step S101 and (ii) the Separations Process of Step S113 [Second Example]—

In some embodiments, there is synergy between (i) the use of light-roasted coffee beans in step S101 and (ii) the separations process of step S113.

For example, it may be desirable in step S113 to reduce a concentration of soluble and/or dissolved galactomannans of the coffee-based ink formulation.

Not wishing to be bound by theory, during roasting galactomannans may be incorporated in Mallaird particles—the darker the roast, the more that galactomannans are incorporated in the Mallaird particles. In contrast, for lighter roast coffee beans, the galactomannans may not have been incorporated into Mallaird particles, and may be in the form of soluble material (i.e. which migrated into the aqueous solution in step S101). It may be easier to separate such soluble material from the aqueous solution (i.e. that will become the ink) using the separation technique of step S113 than melanoidin particles that are incorporated in Mallaird particles. Thus, the use of light-roasted beans may improve the efficiency of the separations step S113.

Additional Note about FIG. 5— in some embodiments, the aqueous solution which eventually becomes the coffee-based ink formulation is subjected to centrifugation and/or filtration before performing step S113 or simultaneous therewith or after performing step S113. For example. For example, a glass and/or POLYETHERSULFONE (PES) MEMBRANE FILTERS or other filter may be employed—e.g. a 0.2 micron or a 0.3 micron or a 0.4 micron filter.

In some embodiments, the coffee ink-formulation (i.e. any disclosed herein—e.g. the formulation manufactured in FIG. 5) is devoid of particles larger than 0.4 microns.

Figure 6:
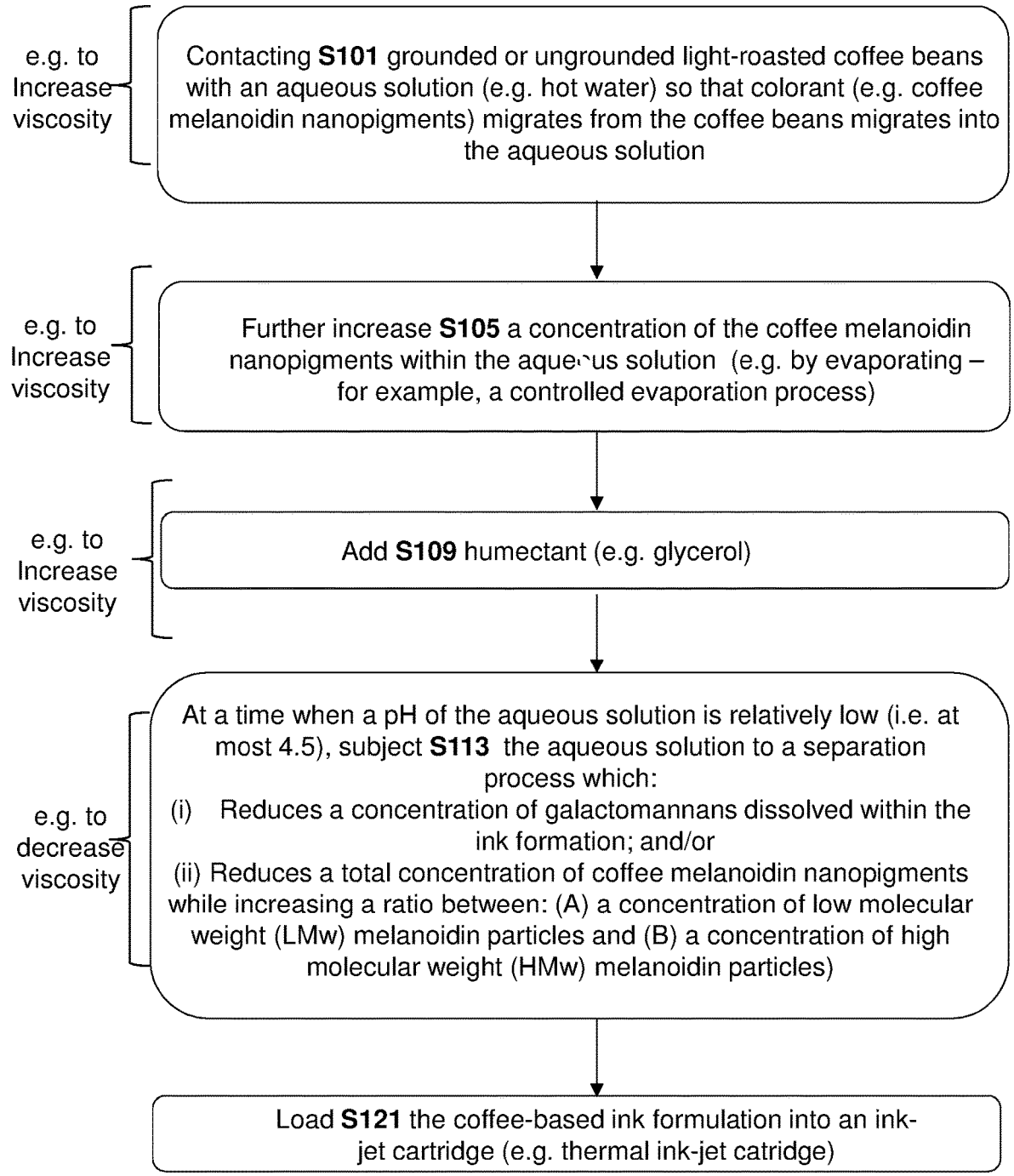

We now refer to FIG. 6. A method includes Steps S101, S105, S109 and S113 as per FIG. 5. In Step S121, the coffee-based ink formulation is loaded into an ink-jet cartridge (e.g. thermal ink-jet cartridge).

We now refer to FIG. 7. A method includes Steps S101, S105, S109 and S113 as per FIG. 5. In Step S125, the ink is jetted onto a foamed beverage to form an image on an upper surface of the beverage.

Surface Tension Properties

In some embodiments, the aqueous coffee-based ink formulation has a relatively high surface tension and/or substantially lacks dispersants (e.g. tweens) or surfactants. In some embodiments, a static surface tension at 25° C. of the aqueous coffee ink formulation is at least 35 dynes/cm or at least 36 dynes/cm or at least 37 dynes/cm or at least 38 dynes/cm or at least 39 dynes/cm or at least 40 dynes/cm. In some embodiments, a static surface tension at 25° C. of the aqueous coffee ink formulation is (i) between 35 dynes/cm and 50 dynes/cm; or (ii) between 36 dynes/cm and 50 dynes/cm; or (iii) between 37 dynes/cm and 50 dynes/cm; or (iv) between 38 dynes/cm and 50 dynes/cm; or (v) between 39 dynes/cm and 50 dynes/cm; or (vi) between 40 dynes/cm and 50 dynes/cm.

Thus, as set forth in the previous paragraph, in embodiments of the invention the surface tension of the aqueous coffee-based ink formulation is relatively high. This may require use of a higher voltage in order to expel droplets of the aqueous coffee-based ink formulation from an ink-jet nozzle. Although use of colorant formulations of these 'relatively high' surface tensions may have relatively poor wetting properties, it is believed (not wishing to be bound by theory) that (i) this so-called wetting-property advantage is not relevant when printing on foamed beverages; and (ii) on the contrary, presence of surfactants and/or dispersants may imbue the aqueous coffee-based ink formulation with anti-foam properties. The present inventors believe that such anti-foam properties are undesirable in the context of ink-jet stable images onto foamed beverages.

Thus, the use of tweens or surfactants or dispersants in some embodiments may be limited.

Properties Useful in Bubble-Jet Printing and Avoiding and/or Minimizing Droplet-Deflection In some embodiments, the presently-disclosed aqueous coffee-based ink formulation is used in bubble-jet printing, a term that is used interchangeably with thermal ink-jet. For example, it may be undesirable for the ink formulation to be 'sticky' so that it is retained on the heating element of the ink-jet apparatus or ink-jet cartridge thereof.

Not wishing to be bound by theory, the present inventor believes that galactomannans (either as dissolved in the solvent or within melanoidins and/or Malliard particles increases the 'stickiness' of the formulation, increasing the risk that the ink formulation would be retained on the heating element of the ink-jet apparatus. The retained formulation may be 'burned' and/or coagulate, leading to droplet deflection.

Viscometer

Viscosity data for the coffee base ink may be determined using a Brookfield DVE LVT viscometer using a No. 00 spindle at 25° C. (±1° C.) at 50 rpm after 30 seconds or 60 rpm after 30 seconds.

Surface Tension:

The methodology used for measuring surface tension of ink may be the Wilhelmy plate Method. The Wilhelmy plate method is a universal method especially suited to check surface tension over time intervals, in short, a vertical plate of known perimeter is attached to a balance, and the force due to wetting is measured. The equipment used and corresponding settings are as follows:

Device: Krüss Tensiometer K20, manufactured by Krüss GmbH. Plate Dimensions: Width: 19.9 nm Thickness: 0.2 mm, Height: 10 mm.

Measurement Settings: immersion depth 2 mm, Surface Detection Sensitivity 0.01 g, Surface Detection Speed 6 min/min, Values 10, Acquisition linear, Max. Measurement Time 60 sec. The liquid to be measured is poured into a clean and dry glass vessel. The sample temperature is controlled at 25° C. The clean and annealed Wilhelmy plate is lowered to the surface of the liquid. The plate is immersed in the fluid to measure and the corresponding value of surface tension is read on the display of the device.

Filtration

Removal of larger undesired particles for the stable ink formulation can be performed using POLYETHER-SULFONE (PES) MEMBRANE FILTERS, 0.03 MICRON, 508×3000 MM, 1/PK or alternatively, Sterlitech PES (polyethersulfone) membrane filters, 0.03 micron pore size, 508×3000 mm sheets, pack of 1. Hydrophilic, low protein/drug binding, minimal extractables, and broad chemical tolerance; ideal for pharmaceutical, medical, and life science applications. Filtration Area soft 1.55 SKU 1110126 Pore Size (μm)

0.03 μm Diameter 508×3000 Pack Size 1 from Stelitech.

What is claimed is:

1. A method of printing with coffee-based ink, the method comprising:
   a. providing a thermal ink-jet cartridge and a quantity of a coffee-based ink disposed within the thermal ink-jet cartridge;
   b. receiving (i) into a digital computer, (ii) from a user, and (iii) via a touch-screen computerized interface, optical density data describing an optical density of the coffee-based ink that is present within an ink-jet pod;
   c. operating the digital computer to compute, from the received optical density data, a customized droplet-size for the coffee-based ink in its current state within the thermal ink-jet cartridge, the computing being performed such that in response to received optical density data indicating that the coffee-based ink has a lower (higher) optical data density, the digital computer computes a larger (smaller) target drop-size; and
   d. operating the digital computer to select electrical pulse parameters that target the customized droplet size; and
   e. operating the thermal ink-jet cartridge according to the selected electrical pulse parameters to deposit droplets of the coffee-based ink onto a surface of a foamed beverage to form an ink-image thereon, where a size of deposited droplets matches the computed customized droplet-size.

2. The method of claim 1 wherein the optical density data received via the touch-screen computerized interface is a 1:90 420 nm absorbance of the coffee-based ink.

3. A printing apparatus for forming a design, the apparatus comprising:
   a. an elevatable tray having a beverage-support surface;
   b. an electrical motor for raising or lowering the elevatable tray;
   c. a quantity of a coffee-based ink;
   d. an ink-jet printer loaded with a thermal ink-jet cartridge, the quantity of coffee-based ink disposed within the thermal ink-jet cartridge, the elevatable tray disposed under the ink-jet cartridge so that the ink-jet printer is configured to deposit droplets of the coffee-based ink onto an upper surface of a beverage that is disposed on the elevatable tray to form the design on the beverage upper surface;
   e. a camera for acquiring images of the designs, that are (i) formed by the ink-jet printer (ii) using the coffee-based ink and (iii) on the beverage upper surfaces;
   f. an image-processing circuitry for analyzing the images of the designs acquired by the camera, the image-processing circuitry configured to detect malfunctioning nozzle(s) of the ink-jet cartridge; and
   g. a nozzle compensation module responsive to output of the image-processing circuitry, the nozzle compensation module being configured to algorithmically pre-process digital images to be printed by the ink-jet printer in accordance with a detected presence and/or location of malfunctioning nozzle(s) so as to minimize a visibility of artifacts within the prints images due to the malfunctioning nozzle(s).

4. The apparatus of claim 3 wherein the artifacts include unprinted or white vertical lines in the image.

5. The apparatus of claim 3 wherein the artifacts include formations produced by deflected droplets that are ejected by malfunctioning nozzles.

6. The apparatus of claim 3 wherein:
A. the image-processing is further configured to both estimate, from the images of the designs acquired by the camera, an optical density of the coffee-based ink in its current state; and
B. the system further comprises:
   h. a droplet size-regulation module responsive to output of the image-processing circuitry, the droplet-size regulation circuitry being configured to regulate a size of droplets of coffee-based ink by controlling, in accordance with the output of the image-processing circuitry, a pulse voltage and/or pulse duration employed by the thermal ink-jet cartridge.

7. The apparatus of claim 6 wherein the droplet size-regulation module responds to a determination, by the image-processing circuitry, that previously-printed designs had insufficient optical density, by controlling a pulse voltage and/or duration of the ink-jet to increase a droplet size relative to previously-produced droplet.

8. An edible aqueous coffee-based ink formulation comprising:
   coffee melanoidin sub-micron pigments suspended within the ink formulation;
   dissolved galactomannans that are dissolved within the ink formulation; and
   a pH control agent for maintaining a pH of the ink formulation between 3.7 and 4.5;
   wherein the aqueous coffee-based ink formulation has one or more of properties A-L the properties being defined as follows:
      according to property A, a 1:90 420 nm absorbance of the aqueous coffee-based ink formulation is at least 0.9 or at least 0.92 or at least 0.94 or at least 0.96 or at least 0.98 or at least 1.0;
      according to property B, when citric acid is added to the aqueous coffee-based ink formulation to reduce a pH thereof by 0.25, a 1:90 420 nm absorbance of pH-reduced aqueous coffee-based ink formulation decreases by at least 10%;
      according to property C, a static surface tension of the aqueous coffee-based ink formulation is at least 34 dynes/cm or at least 36 dynes/cm or at least 38 dynes/cm or at least 40 dynes/cm at 25° C.;
      according to property D, a 25° C. dynamic viscosity of the aqueous coffee-based ink formulation is between 3.0 and 5.0 cP;
      according to property E, a wt/wt % solids of the aqueous coffee-based ink formulation is between 20% and 35%;
      according to property F, (i) a ratio between a concentration of LMw coffee melanoidins in the aqueous coffee-based ink formulation and a concentration of HMw coffee melanoidins in the aqueous coffee-based ink formulation is at least 0.05 or at least 0.1 or at least 0.15 or at least 0.2 or at least 0.25 or at least 0.3 or at least 0.35 or at least 0.4; (ii) LMw coffee melanoidins are defined as coffee melanoidins whose molecular weight is at most 3 kilodaltons (kDa); (iii) LMw coffee melanoidins are defined as coffee melanoidins whose molecular weight is at least 12 kilodaltons (kDa);
      according to property G, the melanoidin sub-micron pigments are a primary colorant of the aqueous coffee-based ink formulation;
      according to property H, after the ink formulation is allowed sit for 2 weeks at room temperature conditions, an 1:90 420 nm absorbance decreases by no more than 30% or no more than 25% or no more than 20% or no more than 15% or no more than 10% or no more than 5%;
      according to property I, after the ink formulation is allowed sit for 2 weeks at room temperature conditions to form a 2-weeks-aged ink formulation, a 1:90 420 nm absorbance of the 2-weeks-aged ink formulation is at least 0.8 or at least 0.82 or at least 0.84 or at least 0.86 or at least 0.88 or at least 0.9 or at least 0.92 or at least 0.94 or at least 0.96 or at least 0.98 or at least 1.0;
      according to property J, at least 50% wt/wt or at least 75% wt/wt or at least 90% wt/wt or at least 95% wt/wt or at least 99% wt/wt of the melanoidins sub-micron pigments are sub-200 nm particles;
      according to property K, the melanoidins sub-micron pigments are the primary colorant of the aqueous coffee-based ink formulation; and
      according to property L, the aqueous coffee-based ink formulation is sourced primarily from light-roast coffee beans.

9. The aqueous coffee-based ink formulation of claim 8, wherein the aqueous coffee-based ink formulation has at least property A.

10. The aqueous coffee-based ink formulation of claim 8, wherein the aqueous coffee-based ink formulation has at least property B.

11. The aqueous coffee-based ink formulation of claim 8, wherein the aqueous coffee-based ink formulation has at least property C.

12. The aqueous coffee-based ink formulation of claim 8, wherein the aqueous coffee-based ink formulation has at least property D.

13. The aqueous coffee-based ink formulation of claim 8, wherein the aqueous coffee-based ink formulation has at least property E.

14. The aqueous coffee-based ink formulation of claim 8, wherein the aqueous coffee-based ink formulation has at least property F.

15. The aqueous coffee-based ink formulation of claim 8, wherein the aqueous coffee-based ink formulation has at least property G.

16. The aqueous coffee-based ink formulation of claim 8, wherein the aqueous coffee-based ink formulation has at least property H.

17. The aqueous coffee-based ink formulation of claim 8, wherein the aqueous coffee-based ink formulation has at least property I.

18. The aqueous coffee-based ink formulation of claim 8, wherein the aqueous coffee-based ink formulation has at least property J.

19. The aqueous coffee-based ink formulation of claim 8, wherein the aqueous coffee-based ink formulation has at least property K.

20. The edible aqueous coffee-based ink formulation of claim 8, wherein the suspended coffee melanoidin sub-micron pigments comprise at least 2% wt/wt or at least 3% wt/wt or at least 4% wt/wt or at least 5% wt/wt or at least 6% wt/wt of the edible aqueous coffee-based ink formulation.

* * * * *